US008510528B2

(12) United States Patent
Rubio et al.

(10) Patent No.: US 8,510,528 B2
(45) Date of Patent: Aug. 13, 2013

(54) DIFFERENTIAL DATA STORAGE BASED ON PREDICTED ACCESS FREQUENCY

(75) Inventors: Paul Anthony Rubio, San Diego, CA (US); Criselda Samera Carrillo, San Diego, CA (US); Aarati Abhijit Khobare, San Diego, CA (US); Gary Lee Boggs, San Diego, CA (US); Kevin Reed Sanders, Escondido, CA (US)

(73) Assignee: Teradata US, Inc., Dayton, OH (US)

( * ) Notice: Subject to any disclaimer, the term of this patent is extended or adjusted under 35 U.S.C. 154(b) by 246 days.

(21) Appl. No.: 12/981,169

(22) Filed: Dec. 29, 2010

(65) Prior Publication Data

US 2012/0173831 A1 Jul. 5, 2012

(51) Int. Cl.
*G06F 12/02* (2006.01)
(52) U.S. Cl.
USPC .................................. 711/165; 711/E12.002
(58) Field of Classification Search
USPC ................... 711/152, 165, E12.002
See application file for complete search history.

(56) References Cited

U.S. PATENT DOCUMENTS

| 7,174,439 | B2 | 2/2007 | Nagase et al. | |
|---|---|---|---|---|
| 7,386,675 | B2 | 6/2008 | Fachan | |
| 7,730,171 | B2 | 6/2010 | Frazier et al. | |
| 8,375,193 | B2 * | 2/2013 | Carrillo et al. | 711/173 |
| 2008/0140691 | A1 | 6/2008 | Li et al. | |
| 2009/0106518 | A1 | 4/2009 | Dow | |
| 2009/0300040 | A1 | 12/2009 | Kaijima et al. | |
| 2010/0274827 | A1 * | 10/2010 | Hix et al. | 707/813 |
| 2012/0221783 | A1 * | 8/2012 | Yamamoto et al. | 711/103 |

* cited by examiner

*Primary Examiner* — Mardochee Chery
(74) *Attorney, Agent, or Firm* — Schwegman, Lundberg & Woessner P.A.

(57) ABSTRACT

Apparatus, systems, and methods may operate to classify storage locations in a storage medium according to at least three response time grades, to classify data to be stored in the storage locations according to at least three access frequency grades, and to migrate the data between the storage locations according to a predicted access frequency assigned to preemptive allocations of some of the storage locations, based on the response time grade and the access frequency grade associated with the data prior to migration. Other apparatus, systems, and methods are disclosed.

17 Claims, 4 Drawing Sheets

DIFFERENTIAL DATA STORAGE BASED ON PREDICTED ACCESS FREQUENCY

COPYRIGHT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the example code, screen shots, and images described below, and in any drawings appended hereto: Copyright 2010 Teradata, Inc. of Miamisburg, Ohio—All Rights Reserved.

BACKGROUND

It is not uncommon to see the amount of data associated with a business venture grow at an exponential pace. To manage the increasing amount of data more efficiently, a database is often created. As the size of the database grows, so do the resources and time involved in processing the data.

In the Virtual Storage System (VSS) environment, storage locations may be categorized into grades that are based on response time. The locations with the lowest response times are faster to respond than locations with a higher response time. The VSS may also operate to categorize data access into access frequency grades. Data with the highest access frequency is considered high temperature data, and data with the lowest access frequency is considered low temperature data. The allocation function of the VSS places data into the graded storage locations according to its access frequency, as specified during the initial allocation request. That is, higher temperature data is placed in faster locations, and lower temperature data is placed in slower locations. After initial allocation, unused storage locations may still exist.

During storage system operation, the VSS may be used to track the access frequency of allocated data, perhaps monitoring its average access frequency. To achieve improved performance, the VSS uses unallocated locations with a faster response time for new data placement, sometimes replacing allocated data based on the recorded access frequency. This process of replacing data is termed "migration". This process can work well in systems with steady-state allocation/de-allocation patterns since, on average, de-allocations are expected to occur in locations that may be ideal for future allocations.

However, some systems do not exhibit this behavior. Instead, this mode of operation has the effect of packing all the high temperature data into those storage locations having the fastest response times, often leaving little or no room to accommodate newly-added data. With the use of an "optimize system" VSS mode, in which substantial system resources are devoted to migrating data to optimal locations, data can be packed into most, if not all available high speed storage locations within the system in a matter of days.

DETAILED DESCRIPTION

To address some of the difficulties described above, in some embodiments, storage locations are categorized into at least three grades: FAST, MEDIUM and SLOW, based on response time. The location with the lowest response time is the fastest location, and the location with the highest response time is the slowest location.

Similarly, data can also be categorized into at least three grades, or temperatures: HOT, WARM and COLD, based on access frequency. Data with the highest frequency of access is considered HOT; data accessed on a moderate basis is considered WARM; and data that is accessed least frequently is considered COLD. The allocation function of the VSS can place data into FAST, MEDIUM or SLOW storage locations based on a data temperature of HOT, WARM or COLD, as specified during the initial allocation request. Thus, HOT data is initially placed in a FAST location. COLD data is initially placed in a SLOW location. After the initial allocation, there will usually be some unused locations associated with various response time grades.

Ordinarily this isn't a problem because, as the VSS is used over time, new storage is added and old data is deleted or moved to offline storage. This frees up FAST locations for new HOT data. Additionally, since all data access is monitored by the VSS, older data that has a cooling temperature is moved to slower locations, while newly allocated data that subsequently heats up is moved to faster locations. This process is not instantaneous, and can therefore impact system performance when the number of available FAST locations is severely limited.

Some embodiments operate to make room on the preferred (faster) areas of storage devices. However, this activity raises questions, such as how much room to allocate, when to make the allocation, and how much importance should be placed on HOT data that will be added in the future? Unnecessarily reserving FAST memory locations wastes system resources, and impacts VSS performance. Even the activity of moving data affects the speed of system operations.

Thus, in many embodiments, VSS operations can be augmented by preemptively allocating storage locations, and assigning a virtual temperature to those locations, as if actual data with that access frequency were stored there.

To determine the number of locations to allocate, the VSS may operate to monitor the net allocation rate for a desired virtual zone. For instance, taking a specified zone or group of FAST locations, the total number of new allocations can be subtracted from the total number of de-allocations in the tracked zone. One implementation might simply "reserve" (i.e., allocate) an amount of space equivalent to the net allocation rate. Thus, some FAST storage locations can be virtually "reserved" initially, according to a historical net allocation of space in that zone.

The "virtual temperature" of this preemptively reserved space can be assigned by monitoring temperatures of incoming allocations. In a relatively simple implementation, this entails monitoring the temperatures of all incoming allocations, perhaps starting with an arbitrary default metric value of 10. For each hot allocation (which is translated into a raw float temperature internally), the metric value is increased. For each cold allocation, the metric value is decreased. The metric can be aged as well. The end result is a metric that predicts the temperature of future allocations. It is this predicted temperature that can be applied to the free (preemptively reserved) space.

Data is migrated to the reserved, free locations when the differential benefit, which is the total benefit of movement less the total cost of movement, is greater than zero, or:

$$\text{total\_benefit}-(\text{actual\_cost\_of\_movement}+\text{virtual\_cost\_of\_movement})>0.$$

Data can be migrated according to movement that provides the greatest differential benefit (total benefit–total cost). Since resources are often limited, in some embodiments, data is migrated only when the differential benefit exceeds some designated threshold value.

The total_benefit can be calculated as the product of the benefit rate (BR) and the migration benefit lifetime (MBL). The MBL is a value that reflects how long the data to be moved is expected to retain its current temperature, before cooling. The MBL can vary based upon the data's longevity–customer data tends to have long longevity while internal data allocated to facilitate queries has short longevity. Thus, if customer data is given an MBL of 10 weeks, the total_benefit is BR*10 weeks.

The BR can be calculated as $T1*(R1-R2)$, where actual data having a temperature T1 is to be moved from a location with response time of R1 to a location with a response time of R2.

The virtual_cost_of_movement is calculated using the virtual temperature assigned to the preemptively reserved, free space. Hence, the virtual cost entails moving phantom data with a virtual temperature Tv1 from, for example, a cylinder with a virtual response Rv1 to cylinder with a virtual response Rv2, so that the virtual_cost_of_movement=$Tv1*(Rv1-Rv2)$.

The actual_cost_of_movement depends on the system architecture where the mechanism is applied. When migration from a device is initiated, I/O operations are added to the source device, slowing subsequent access. Similarly, I/O operations are added when data is migrated to a device, slowing the destination device as well. For example, in some systems migration involves several I/O operations, some based on disk operations for the main data movement, and some based on smaller supporting memory operations used to update internal metadata. Limits on block sizes and cylinder sizes also affect the actual cost of movement. The queue depths and response times associated with the source and destination locations may also affect the actual cost of movement. These costs will vary with the type of hardware used to store the data, including its relative size and electro/mechanical makeup. One formula that can be used to determine the actual_cost_of_movement is the product of a first constant, the source device queue depth, and a function of the source device response time grade (e.g., response time raised to a power) plus the product of a second constant, the destination device queue depth, and a function of the destination device response time grade (e.g., response time raised to a power), or more compactly:

$$\text{Constant1}*\text{Source\_queue\_depth}*f(\text{Source\_resp\_time})+\\\text{Constant2}*\text{Destination\_queue\_depth}*f(\text{Destination\_resp\_time})$$

By using the apparatus, systems, and methods described herein, the performance penalty due to unnecessary migration of data can often be dramatically reduced. An example of the potential for improvement will now be described.

Figure 1:
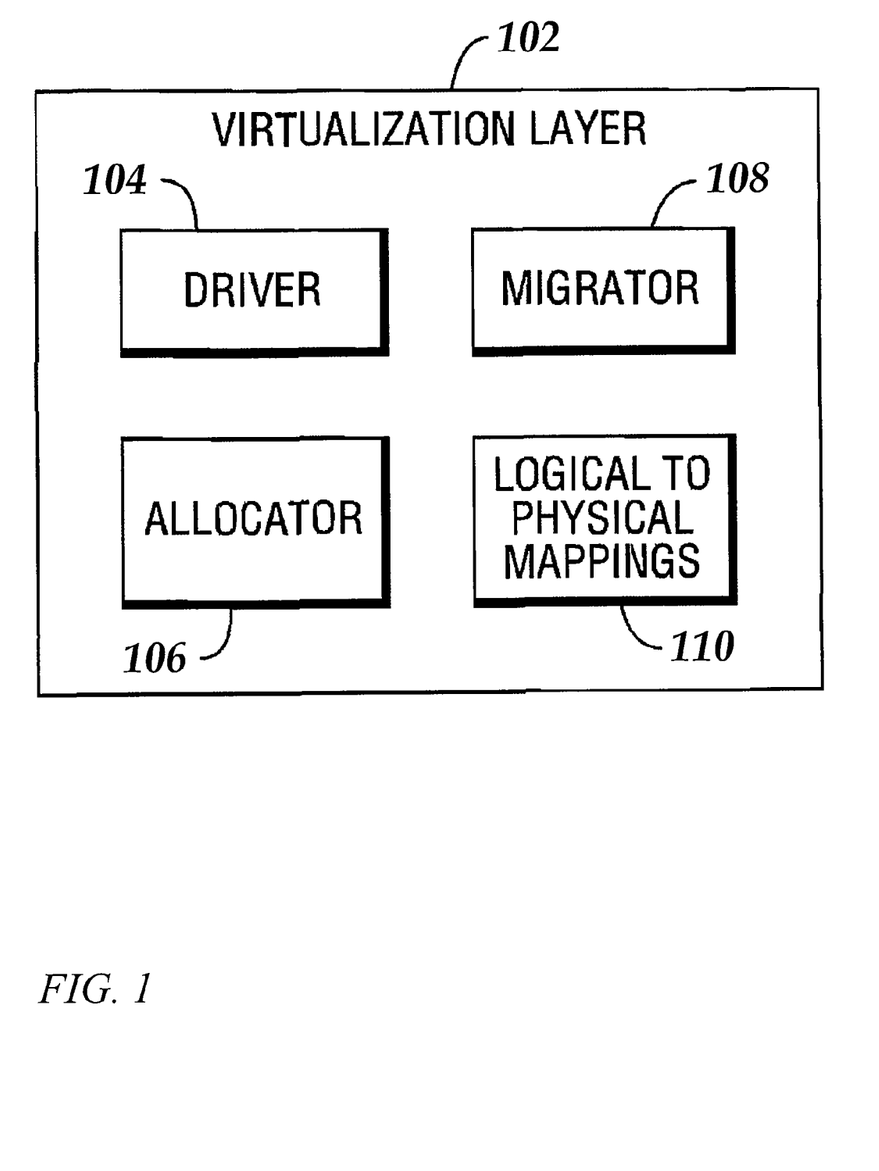
FIG. 1 illustrates a storage virtualization layer, according to various embodiments of the invention.

FIG. 1 illustrates a storage virtualization layer 102, according to various embodiments of the invention. The virtualization layer 102 includes modules that perform functions to implement various embodiments described herein. In some embodiments, the modules include a driver 104, an allocator module 106, a migrator module 108, and a mapping module 110.

In some embodiments, the driver 104 receives logical data access requests from users and translates those requests into physical addresses utilizing data stored in the mapping module 110. The driver accesses the requested data, and provides a return to the calling user. The allocator module 106 handles preemptive allocation of data storage locations as described above. The migrator module 108 performs the monitoring and measuring of database performance to match logical extents and physical extents properly. The migrator module 108 also builds, chooses, and executes data migration plans. The virtualization layer 102 may include more or fewer modules depending on the particular embodiment.

The storage virtualization layer 102 may comprise a VSS. Since the VSS monitors and records all accesses to data, the VSS can take special note of newly or recently allocated data. Using exponential decay models, a virtual temperature can be derived, and applied to future allocations, as part of the allocator module 106 activity. By incorporating the virtual temperature into migration decisions, systems can be used more efficiently. For example, questions such as "Will moving data with temperature X to a free location Y with virtual temperature Z achieve a positive benefit?" can now be answered. This is useful to know, since in most embodiments, the data being moved is inaccessible during the migration process.

As noted previously, a relatively uncomplicated preemptive extent reservation mechanism might comprise reserving a number of storage locations approximately equal to the total number of new allocations less the total number of de-allocations in a tracked HOT storage location zone. The virtual temperature described previously can be applied to storage locations reserved in this manner.

A more sophisticated approach to predicting the number of extents to reserve, with an assigned virtual temperature, might involve tracking, using decay models, the rate at which data is added and removed from the system (e.g., number of extents/second). A first metric might track the number of allocated extents, decayed over time. A second metric might track the number of extents that are de-allocated, decayed over time. The VSS could then, when making decisions about how much free space to reserve in association with a virtual temperature, use these metrics along with the benefit lifetime. For instance, the number of extents to keep free might be obtained by taking the benefit lifetime (e.g., default of a week) multiplied by the difference of the metrics tracking allocations/de-allocations.

Once free storage locations in some extents are reserved, and a virtual temperature is assigned, these locations will appear to the system as if the reserved extents are being used to store data of the assigned temperature, when in fact there is no actual data stored. The cost of moving this phantom data is then proportional to the assigned temperature, and can be used in cost/benefit calculations.

As noted previously, storage locations can be classified according to response time grades. For example, individual cylinders or other groupings of locations on a disk can be classified into a number of grades equal to the number of cylinders/groups in the system. The classes may be determined by recording response times using sample data, with the response times used to set the grade associated with a particular location, or set of locations. Thus, X response grades could be exposed on a system with X cylinders/groups. The response time grades for each cylinder/group may be stored as metadata, along with the temperature grade classification of data that is stored there. Typically, response times do not change very much after initial assignment, unless there is very heavy mechanical disk usage. Thus, in some embodiments, response time may be modeled and/or decayed.

Similarly, data can be classified according to its access frequency, and divided into any arbitrary number of grades. The access frequency grades can be decayed to reflect newer trends in access, such as when COLD data "heats up" and is accessed more frequently than in the past. Or when HOT data "cools off", and is accessed less and less frequently.

When data is initially allocated, the file system may provide an initial temperature to associate with the data. For instance, data may be newly allocated as a "spool", which has a short lifetime and a HOT designation. Internally, the HOT designation may be translated into a real numerical (unit-less) value, which may be derived from real temperatures measured within the system. As this new data is accessed, it can heat up or cool down. The initial arbitrary number assigned might be any value, but eventually be equated to a real value, such as the approximate number of accesses expected within a given time period. Adjusted over time, this value may come to reflect the actual number of accesses over the selected time period. System administrators or other users can designate initially what percentile of data, ranked according to access frequency, will be HOT (e.g., the highest 80-100% in access frequency), WARM (the middle 20-80% in access frequency), and COLD (the lowest 20% in access frequency).

To consider how decay modeling can be applied to the net allocation rate (for free storage) and the temperature of a tracked storage area, first consider an application to the allocation rate. A running average (constant metric) of net allocation can be maintained, and used to determine the amount of free storage to allocate in conjunction with an assigned virtual temperature. The constant metric (CM), which can be equated to the amount of free storage to allocate to a selected virtual temperature, can be periodically updated according to the exponential average formula:

$$CM_{new} = \alpha * M + (1-\alpha) * CM_{old}. \quad [1]$$

For example, an initial value of 25% of the available free memory can be chosen as the initial value of CM (i.e., $CM_{old}$), with M equal to a measure of the current net allocation, and a being a configurable parameter that affects how quickly $CM_{new}$ responds to system usage. After each new value of M is measured, the previous value of $CM_{new}$ is used in place of $CM_{old}$, and a new value of $CM_{new}$ is then determined. If necessary, the amount of free memory assigned to a selected virtual temperature is then adjusted to match the most recently calculated value of $CM_{new}$.

By setting a appropriately, the value of CM can be effectively customized on a per-system basis. For example, a may be set on a one-time basis (and later adjusted if desired) as:

$$\alpha = 1 - 2^{(-period\ of\ M\ measurement/desired\ CM\ response\ time)}. \quad [2]$$

Thus, if M is measured every minute, and a response time of 60 minutes with respect to re-allocating free memory associated with a virtual temperature is desired, $\alpha = 1-2^{(-1/60)} \neq 0.01$.

To monitor the system and adjust the memory allocation, background tasks can be used. The net allocation measurement task can be set to measure the net allocation once every minute, and to calculate the value of formula [1], using the value of a determined using formula [2]. The free memory re-allocation task can be set to run once per hour, and is used to decay the value of CM to reflect the most recent value of $CM_{new}$ determined by the net allocation measurement task.

Decaying the value of CM is used in order to account for systems whose operating characteristics have changed. For example, when newly accessed data cools significantly, the amount of free storage locations allocated in a predictive fashion and associated with HOT data should be reduced. Algorithmically, the free memory re-allocation task that runs once an hour can operate to do the following for each run:

update the value of $CM_{new}$ using the most recent value of M (determined once per minute)

apply the updated value of $CM_{new}$ to the system's global predicted free space allocation parameter.

Using this algorithm, an illustration of how quickly CM changes over time can be given. For example, consider that a system operates with a steady state value of M at 20%. If the initial value of CM=the initial value of $CM_{old}$=25%, then in 60 minutes of measuring 20% once per minute, the value of $CM_{new}$ will decay to approximately 22%. After 240 minutes (4 hours) of measuring 20% as the value of M, $CM_{new}$ will decay to approximately 20%. Subsequent updates will oscillate around 20%. In some embodiments, a threshold value of CM can be set, below which preemptive allocations will not be permitted.

Similar operations may occur with respect to decaying the virtual temperature that is assigned to the preemptively allocated free storage locations. That is, a running average of the incoming data allocations may be measured as the value of M, and a value of a can be assigned to tailor the desired response time. Updates can be applied at the same time the allocation is adjusted, or at other times.

Thus, many embodiments of the invention may be realized, and each can be implemented in a variety of architectural platforms, along with various operating and server systems, devices, and applications. Any particular architectural layout or implementation presented herein is therefore provided for purposes of illustration and comprehension only, and is not intended to limit the various embodiments.

Figure 2:
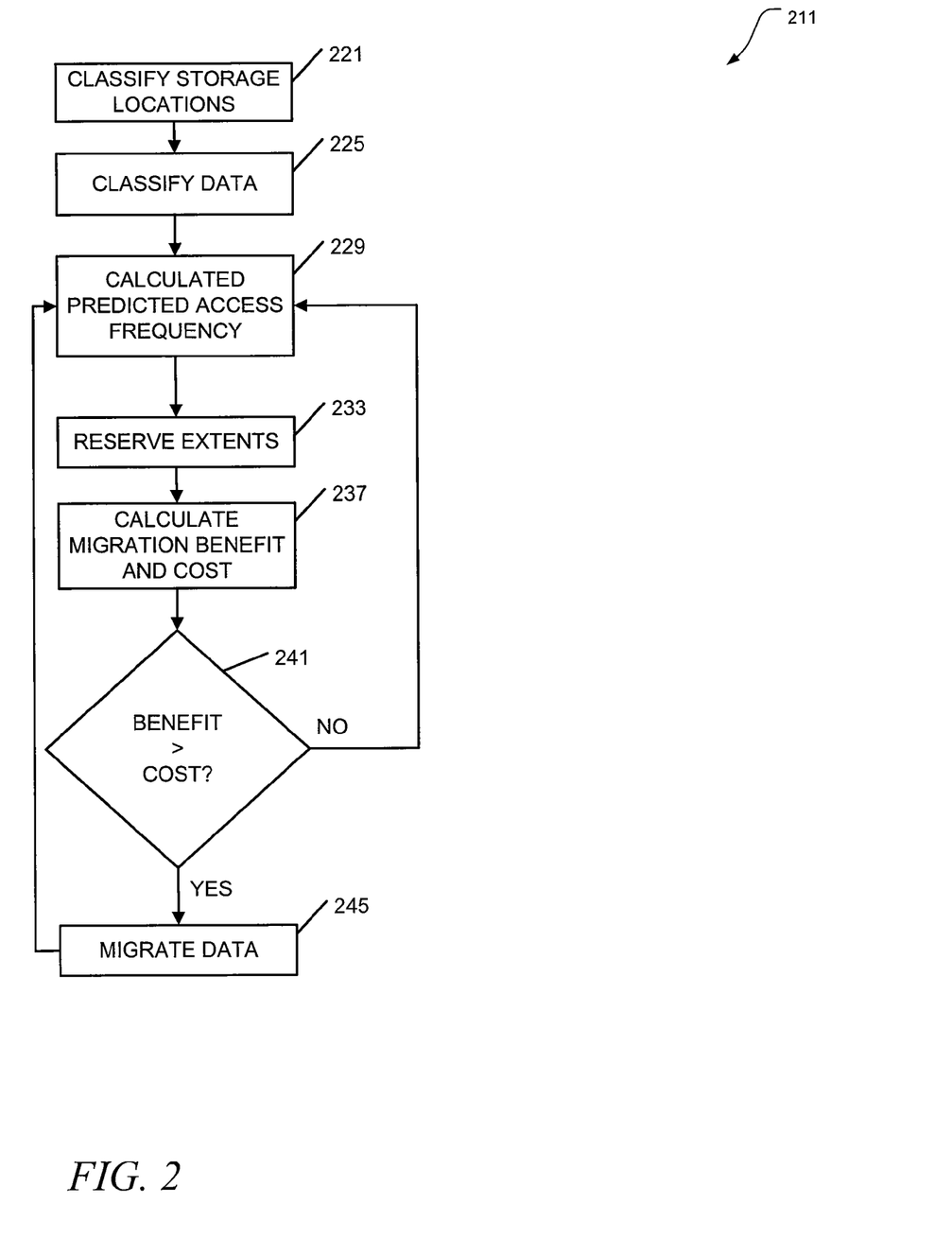
FIG. 2 is a flow diagram illustrating several methods according to various embodiments of the invention.

FIG. 2 is a flow diagram illustrating several methods 211 according to various embodiments of the invention. The methods 211 are implemented in a machine-accessible and readable medium, and are operational over processes within and among networks. The networks may be wired, wireless, or a combination of wired and wireless. The methods 211 may be implemented as instructions, which when accessed by a specific machine, perform the processing depicted in FIG. 2.

As noted previously, measured and decay-modeled access frequency (e.g., the exponential decay modeled access frequency of data, or "temperature", as it is sometimes known to those of ordinary skill in the art) can be used to predict how currently allocated data will be accessed for the purposes of data migration, via cost/benefit calculations. This concept is extended in various embodiments using two metrics: the (historical) net number of extents allocated/de-allocated to some given device response time grade zone over time, and the predicted access frequency of these allocated/de-allocated extents. The set of extents to be preemptively reserved might comprise a group of extents that have response time grades between two values (e.g., 10 ms and 12 ms), or perhaps the extents for an entire device (e.g., a solid state disk drive).

The first metric can be used to determine how much "virtual space" should be preemptively reserved for allocations in the future. The second metric can be used to apply a "virtual temperature" to the reserved "virtual space". The virtual temperature can serve as an additional cost term in a data migration cost/benefit analysis, as noted previously.

Thus, the access frequency of past/present allocations can be used to predict the cost/benefit of moving data in the future. However, using the metrics, a "predicted access frequency"

can be developed that refers to the predicted access frequency of future allocations. In some embodiments, the predicted access frequency (of future allocations) can then be used in operations and calculations to drive data movement as part of a more refined cost/benefit analysis.

Thus, in many of the implementations of the method 211, data is migrated according to a predicted access frequency assigned to preemptively reserved storage locations (of a particular response time grade—usually a FAST grade, or its equivalent). Decay modeling of data access frequency grades and/or storage location response time grades may be used to determine how many locations are reserved, and what predicted access frequency should be assigned to them.

In some embodiments, the method 211 may comprise a processor-implemented method to execute on one or more processors that perform the method. In any case, the method 211 may begin at block 221 with classifying storage locations in a storage medium according to at least three response time grades.

In some embodiments, a response time grade can be assigned to each cylinder in the storage medium. Thus, the number of the response time grades may be approximately equal to the number of cylinders in the storage medium, or across the system.

The method 211 may continue on to block 225 with classifying data to be stored in the storage locations according to at least three access frequency grades. In some embodiments, the system can provide an indication of an appropriate initial access frequency grade based on the type of space allocation provided for the data within the system, such as PERM, TEMP, or SPOOL, allocation types that are well-known to those of ordinary skill in the art. Thus, the activity at block 225 may comprise determining an initial response time grade to be assigned to the data based on a space allocation type associated with the data.

"Preemptively" reserved extents or storage locations are extents or storage locations that are allocated and assigned an access frequency grade, even if no data is actually stored in those extents/storage locations. In this way, extents/locations that have a FAST response time, for example, are always available to receive real data that has a high access frequency. Thus, the method 211 may include assigning an access frequency grade that is higher than other ones of the access frequency grades to reserved extents in the storage medium, wherein the reserved extents are associated with a response time grade that is higher than other ones of the response time grades.

Decay modeling, including exponential decay modeling, can be used to determine how many storage locations should be preemptively reserved (i.e., the number of "virtual locations"), and what access frequency should be assigned to those locations (i.e., the "virtual temperature" of the preemptively reserved locations). Thus, the activity at blocks 221 and 225 may comprise modeling the response time grades and/or the access frequency grades using an exponential decay formula.

Decay modeling may involve tracking the allocation of extents. Thus, the decay modeling may comprise monitoring a number of allocated extents, de-allocated extents, or a function of the allocated and de-allocated extents, in the storage medium, decayed over time. Decay modeling may also involve tracking the access frequency of the data. Thus, decay modeling may comprise monitoring the access frequency of the data, decayed over time.

The method 211 may continue on to block 229 with calculating the predicted access frequency. As noted previously, this may be accomplished by determining a value (e.g., the temperature) associated with the access frequency for actual data allocations over a selected time period, by determining a running average of this value, or by decay modeling of this value.

The method 211 may continue on to block 233 with preemptively reserving storage locations. For example, extents can be preemptively reserved based on the observed benefit lifetime of the data, which can be proportional to the time remaining before the data is moved. Thus, the method 211 may continue on to block 233 with preemptively reserving a number of extents in the storage medium based on a calculated benefit lifetime of the data, perhaps approximately proportional to the expected time remaining before the data is next moved. In some embodiments, as noted previously, this may be accomplished by determining the net number of extents allocated/de-allocated over a selected time period, by determining a running average of this number, or by decay modeling of this number.

The number of extents to reserve for data can also be based on the benefit lifetime of the data, minus the difference between decay-modeled allocated extents and decay-modeled de-allocation extents. Thus, the activity at block 233 may comprise preemptively reserving a number of reserved extents in the storage medium in an amount approximately proportional to a calculated benefit lifetime of the data, multiplied by a difference between the number of allocated extents in the storage medium, decayed over time, and the number of de-allocated extents in the storage medium, decayed over time.

The method 211 may continue on to block 237, to calculate the migration benefit and cost. Thus, the activity at block 237 may comprise calculating the benefit of moving the data in proportion to the access frequency grade associated with the data, multiplied by a difference between the response time grade associated with a first one of the storage locations and the response time grade associated with a second one of the storage locations. In some embodiments, the activity at block 237 comprises calculating the cost of moving the data in proportion to at least one queue depth associated with the storage medium and a number of input/output operations used to move the data, or the sum of two products: the source queue depth and response time, and the destination queue depth and response time.

The data can be moved by implementing a cost benefit analysis, where the data is moved when the benefit of moving the data exceeds the cost of moving the data. Thus, the method 211 may continue on to block 241 to make this determination. The activity at block 241 may comprise determining that the data should be migrated from a first one of the storage locations to a second one of the storage locations when the benefit of moving the data is greater than the cost of moving the data. If the cost is equal to or greater than the benefit, the data is not migrated, and the method 211 may return to block 229.

If the benefit of moving the data exceeds the cost, then the method 211 may continue on to block 245 with migrating the data between the storage locations according to a predicted access frequency assigned to preemptive allocations of some of the storage locations, based on the response time grade and the access frequency grade associated with the data prior to migration.

Subsets of the data may be moved in an order that is based on the differential benefit value calculated for each subset. Thus, the activity at block 245 may comprise selectively moving subsets of the data in an order determined by values of a difference (e.g., differential value) between the benefit minus the cost, wherein the values are calculated for each one of the subsets.

The methods described herein do not have to be executed in the order described, or in any particular order. Moreover, various activities described with respect to the methods identified herein can be executed in repetitive, serial, or parallel fashion. The individual activities of the methods shown in FIG. 2 can also be combined with each other and/or substituted, one for another, in various ways. Information, including parameters, commands, operands, and other data, can be sent and received in the form of one or more carrier waves. Thus, many other embodiments may be realized.

The methods shown in FIG. 2 can be implemented in various devices, as well as in a computer-readable storage medium, where the methods are adapted to be executed by one or more processors. Further details of such embodiments will now be described.

Figure 3:
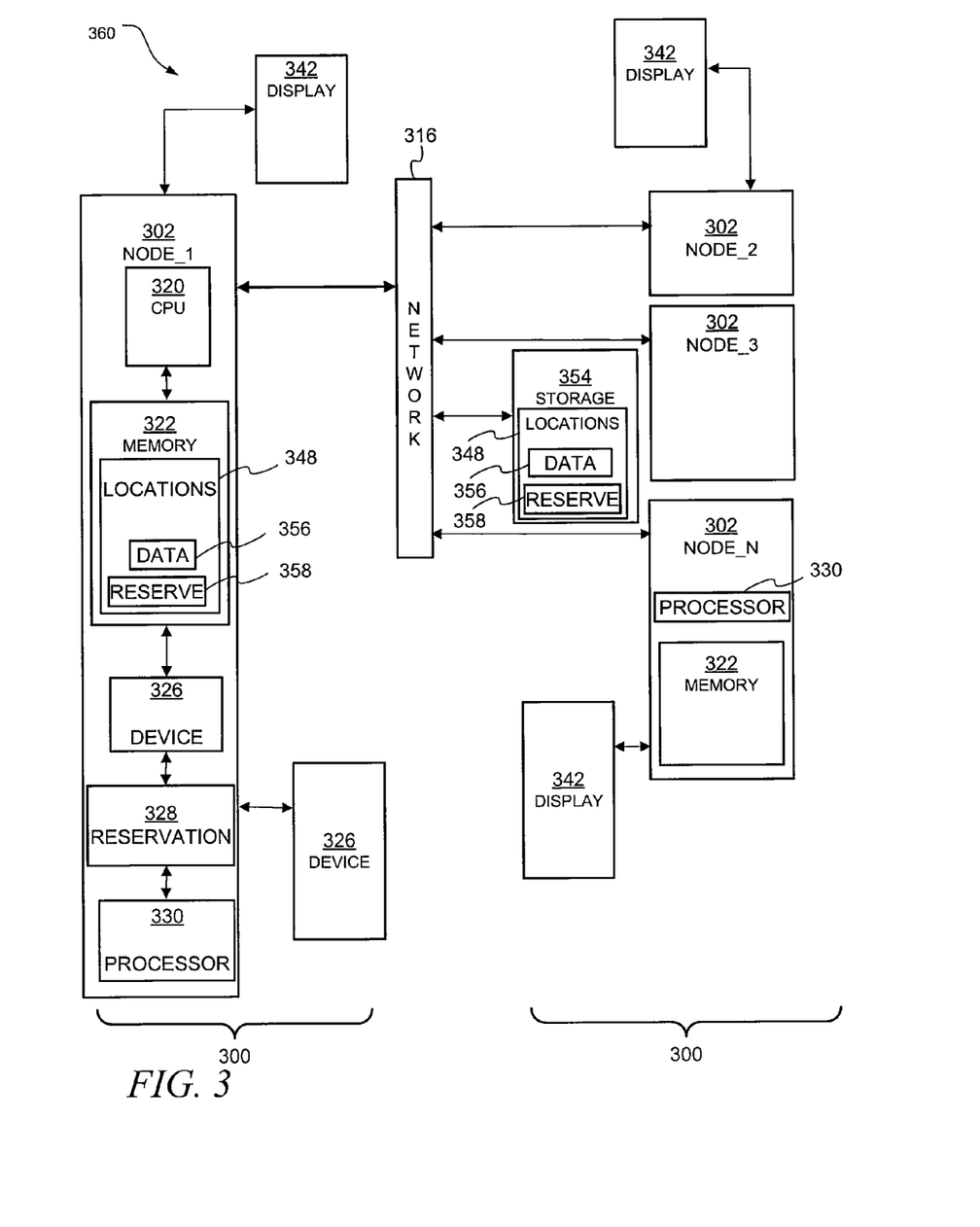
FIG. 3 is a block diagram of apparatus and systems according to various embodiments of the invention.

FIG. 3 is a block diagram of apparatus 300 and systems 360 according to various embodiments of the invention. Here it can be seen that an apparatus 300 used to implement data aware storage system operations may comprise one or more processing nodes 302, one or more processors 320, 330, memories 322, one or more user input devices 326, and one or more displays 342. The apparatus 300 may comprise a client, a server, or a networked processing node.

The processing nodes 302 may in turn comprise physical machines or virtual machines, or a mixture of both. The nodes 302 may also comprise networked entities, such servers and/or clients. In some cases, the operations described herein can occur entirely within a single node 302.

In some embodiments then, an apparatus 300 may comprise a storage medium (e.g., memory 322, or a mechanical or solid-state disk) having storage locations 348. The apparatus 300 may further comprise one or more processors 320, 333 to classify the storage locations 348 and data 356 to be stored in the storage locations 348. Classification can occur as described previously, and the processors 320, 330 can be used to migrate the data 356 between the storage locations 348 according to the predicted access frequency assigned to preemptive allocations of some of the storage locations 348, based on the response time grade and the access frequency grade associated with the data prior to migration.

The apparatus 300 may include a reservation module 328 to reserve extents for new data having a potentially high access frequency, such as data coming from a memory having SPOOL space allocation. Thus, the apparatus 300 may comprise a reservation module 328 to preemptively reserve extents in the storage medium, providing a number of reserved extents based on assigning an access frequency grade that is higher than other ones of the access frequency grades to the reserved extents, wherein the reserved extents are associated with a response time grade that is higher than other ones of the response time grades, prior to storing the data 356 in the reserved extents 358.

The data can be processed by multiple processors, and distributed among multiple storage nodes. Thus, the apparatus 300 may comprise multiple database processors 320, 330, coupled to corresponding storage nodes 354 that each include some of the data 356 that form a portion of a database.

Data processing and storage can likewise be distributed among multiple nodes, which may use access module processors (AMPs) to process the data. Thus, the apparatus 300 may comprise a first node (e.g., NODE_1) to house the storage medium (e.g., memory 322), and a second node (NODE_N) to house the processor 330 comprising an access module processor.

The storage medium may comprise multiple types of devices. Thus, the storage medium (e.g., memory 322 or node 354) may comprise a combination of solid-state storage devices and mechanical storage devices.

Still further embodiments may be realized. For example, it can be seen that a system 360 that implements various operations described herein may comprise multiple instances of the apparatus 300. The system 360 might also comprise a cluster of nodes 302, including physical and virtual nodes. It should be noted that any of the nodes 302 may include any one or more of the elements explicitly shown in nodes NODE_1, NODE_2, NODE_3, . . . NODE_N, and one or more storage nodes 354.

The apparatus 300 and systems 360 may be implemented in a machine-accessible and readable medium that is operational over one or more networks 316. The networks 316 may be wired, wireless, or a combination of wired and wireless. The apparatus 300 and system 360 can be used to implement, among other things, the processing associated with the methods 211 of FIG. 2. Modules may comprise hardware, software, and firmware, or any combination of these. Additional embodiments may be realized.

Figure 4:
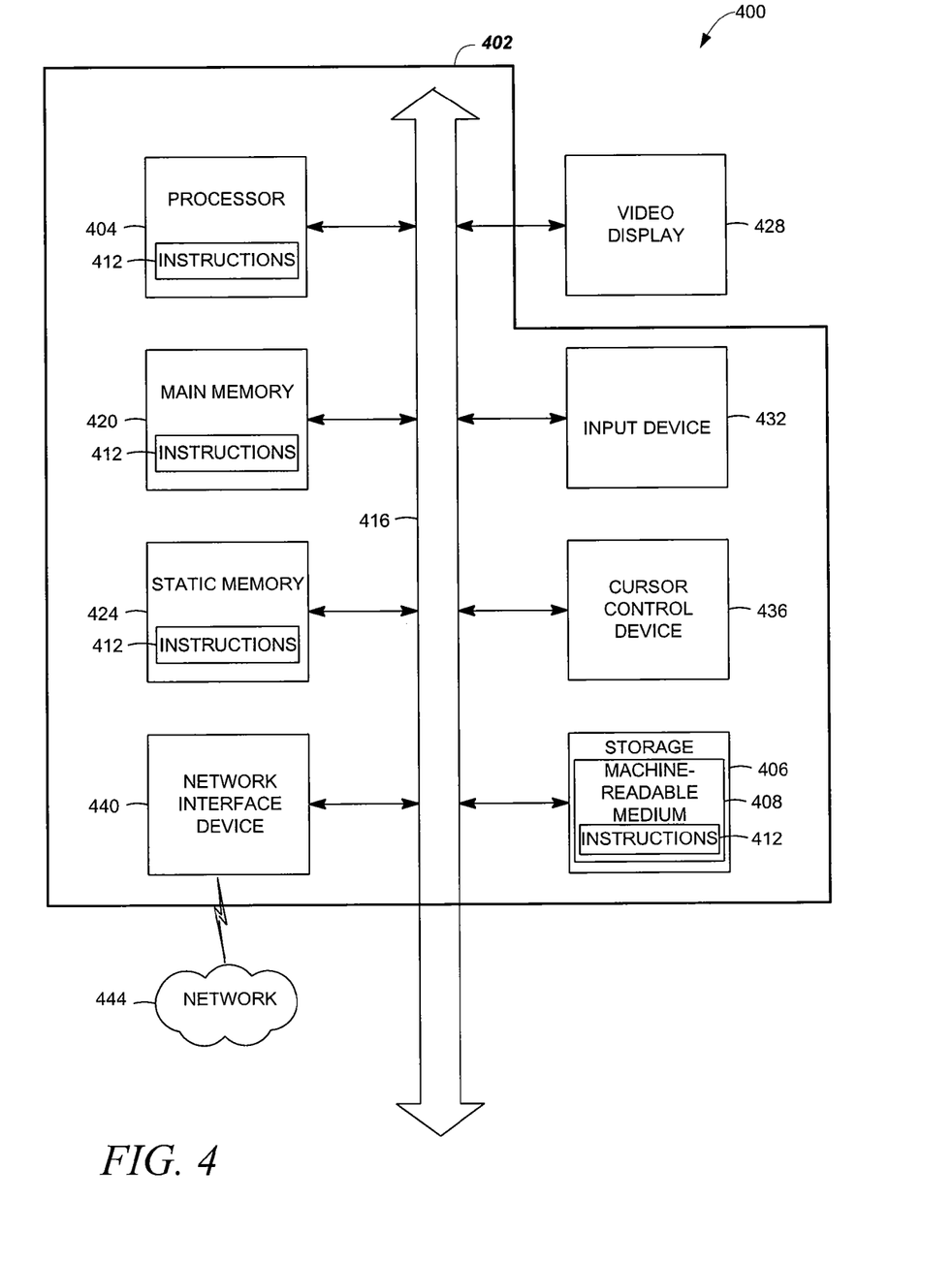
FIG. 4 is a block diagram of an article of manufacture, including a specific machine, according to various embodiments of the invention.

For example, FIG. 4 is a block diagram of an article 400 of manufacture, including a specific machine 402, according to various embodiments of the invention. Upon reading and comprehending the content of this disclosure, one of ordinary skill in the art will understand the manner in which a software program can be launched from a computer-readable medium in a computer-based system to execute the functions defined in the software program.

One of ordinary skill in the art will further understand the various programming languages that may be employed to create one or more software programs designed to implement and perform the methods disclosed herein. The programs may be structured in an object-oriented format using an object-oriented language such as Java or C++. Alternatively, the programs can be structured in a procedure-oriented format using a procedural language, such as assembly or C. The software components may communicate using any of a number of mechanisms well known to those of ordinary skill in the art, such as application program interfaces or interprocess communication techniques, including remote procedure calls. The teachings of various embodiments are not limited to any particular programming language or environment. Thus, other embodiments may be realized.

For example, an article 400 of manufacture, such as a computer, a memory system, a magnetic or optical disk, some other storage device, and/or any type of electronic device or system may include one or more processors 404 coupled to a machine-readable medium 408 such as a memory (e.g., removable storage media, as well as any memory including an electrical, optical, or electromagnetic conductor) having instructions 412 stored thereon (e.g., computer program instructions), which when executed by the one or more processors 404 result in the machine 402 performing any of the actions described with respect to the methods above.

The machine 402 may take the form of a specific computer system having a processor 404 coupled to a number of components directly, and/or using a bus 416. Thus, the machine 402 may be similar to or identical to the apparatus 300 or system 360 shown in FIG. 3.

Turning now to FIG. 4, it can be seen that the components of the machine 402 may include main memory 420, static or non-volatile memory 424, and mass storage 406. Other components coupled to the processor 404 may include an input device 432, such as a keyboard, or a cursor control device 436, such as a mouse. An output device 428, such as a video display, may be located apart from the machine 402 (as shown), or made as an integral part of the machine 402.

A network interface device 440 to couple the processor 404 and other components to a network 444 may also be coupled to the bus 416. The instructions 412 may be transmitted or received over the network 444 via the network interface device 440 utilizing any one of a number of well-known transfer protocols (e.g., HyperText Transfer Protocol). Any of these elements coupled to the bus 416 may be absent, present singly, or present in plural numbers, depending on the specific embodiment to be realized.

The processor 404, the memories 420, 424, and the storage device 406 may each include instructions 412 which, when executed, cause the machine 402 to perform any one or more of the methods described herein. In some embodiments, the machine 402 operates as a standalone device or may be connected (e.g., networked) to other machines. In a networked environment, the machine 402 may operate in the capacity of a server or a client machine in server-client network environment, or as a peer machine in a peer-to-peer (or distributed) network environment.

The machine 402 may comprise a personal computer (PC), a tablet PC, a set-top box (STB), a PDA, a cellular telephone, a web appliance, a network router, switch or bridge, server, client, or any specific machine capable of executing a set of instructions (sequential or otherwise) that direct actions to be taken by that machine to implement the methods and functions described herein. Further, while only a single machine 402 is illustrated, the term "machine" shall also be taken to include any collection of machines that individually or jointly execute a set (or multiple sets) of instructions to perform any one or more of the methodologies discussed herein.

While the machine-readable medium 408 is shown as a single medium, the term "machine-readable medium" should be taken to include a single medium or multiple media (e.g., a centralized or distributed database, and/or associated caches and servers, and or a variety of storage media, such as the registers of the processor 404, memories 420, 424, and the storage device 406 that store the one or more sets of instructions 412). The term "machine-readable medium" shall also be taken to include any medium that is capable of storing, encoding or carrying a set of instructions for execution by the machine and that cause the machine 402 to perform any one or more of the methodologies of the present invention, or that is capable of storing, encoding or carrying data structures utilized by or associated with such a set of instructions. The terms "machine-readable medium" or "computer-readable medium" shall accordingly be taken to include non-transitory, tangible media, such as solid-state memories and optical and magnetic media.

Various embodiments may be implemented as a standalone application (e.g., without any network capabilities), a client-server application or a peer-to-peer (or distributed) application. Embodiments may also, for example, be deployed by Software-as-a-Service (SaaS), an Application Service Provider (ASP), or utility computing providers, in addition to being sold or licensed via traditional channels.

Implementing the apparatus, systems, and methods described herein may operate to improve the efficiency of migrating data within a data processing system (e.g., an Electronic Data Warehouse). Increased processing speed and customer satisfaction may result.

This Detailed Description is illustrative, and not restrictive. Many other embodiments will be apparent to those of ordinary skill in the art upon reviewing this disclosure. The scope of embodiments should therefore be determined with reference to the appended claims, along with the full scope of equivalents to which such claims are entitled.

The Abstract of the Disclosure is provided to comply with 37 C.F.R. §1.72(b) and will allow the reader to quickly ascertain the nature of the technical disclosure. It is submitted with the understanding that it will not be used to interpret or limit the scope or meaning of the claims.

In this Detailed Description of various embodiments, a number of features are grouped together in a single embodiment for the purpose of streamlining the disclosure. This method of disclosure is not to be interpreted as an implication that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An apparatus, comprising:
a processor to:
classify storage locations of a storage medium according to at least three response time grades;
classify data to be stored in the storage locations according to at least three access frequency grades; and
migrate the data between the storage locations according to a predicted access frequency assigned to preemptive allocations of some of the storage locations, wherein the predicted access frequency is based on modeling a response time grade and an access frequency grade corresponding to the data prior to migration; and
a reservation module to preemptively reserve extents in the storage medium, providing a number of reserved extents based on assigning an access frequency grade that is higher than other ones of the access frequency grades to the reserved extents, wherein the reserved extents are associated with a response time grade that is higher than other ones of the response time grades, prior to storing the data in the reserved extents.

2. The apparatus of claim 1, further comprising:
multiple database processors, including the processor, coupled to corresponding storage nodes that each include some of the data that form a portion of a database.

3. The apparatus of claim 1, further comprising:
a first node to house the storage medium; and
a second node to house the processor comprising an access module processor.

4. The apparatus of claim 1, wherein the storage medium comprises a combination of solid state storage devices and mechanical storage devices.

5. A processor-implemented method to execute on one or more processors that perform the method, comprising:
classifying storage locations in a storage medium according to at least three response time grades;
classifying data to be stored in the storage locations according to at least three access frequency grades; and
migrating the data between the storage locations according to a predicted access frequency assigned to preemptive allocations of some of the storage locations, the predicted access frequency based on modeling a response time grade and an access frequency grade corresponding to the data prior to migration; and
preemptively reserving a number of reserved extents in the storage medium in an amount aproximately proportional to a calculated benefit lifetime of the data multiplied by a difference between a number of allocated extents in the storage medium, decayed over time, and a number of de-allocated extents in the storage medium, decayed over time.

6. The method of claim 5, wherein the modeling includes decay modeling, the decay modeling comprising:
monitoring a number of allocated extents, de-allocated extents, or a function of the allocated and de-allocated extents, in the storage medium, decayed over time.

7. The method of claim 5, wherein the decay modeling comprises:
monitoring access frequency of the data, decayed over time.

8. The method of claim 5, further comprising:
calculating a benefit lifetime of the data as a time period approximately proportional to an expected time remaining before the data is next moved.

9. The method of claim 5, further comprising:
determining an initial response time grade to be assigned to the data based on a space allocation type associated with the data.

10. The method of claim 5, wherein a number of the response time grades is approximately equal to a number of cylinders in the storage medium.

11. The method of claim 10, further comprising:
migrating the data from a first one of the storage locations to a second one of the storage locations when a benefit of moving the data is greater than a cost of moving the data.

12. The method of claim 11, further comprising:
calculating the benefit of moving the data in proportion to the access frequency grade associated with the data, multiplied by a difference between the response time grade associated with the first one of the storage locations and the response time grade associated with the second one of the storage locations.

13. The method of claim 11, further comprising:
calculating the cost of moving the data in proportion to at least one queue depth associated with the storage medium and a number of input/output operations used to move the data.

14. The method of claim 11, wherein migrating the data further comprises:
selectively moving subsets of the data in an order determined by values of a difference between the benefit minus the cost, wherein the values are calculated for each one of the subsets.

15. The method of claim 5, further comprising:
assigning an access frequency grade that is higher than other ones of the access frequency grades to reserved extents in the storage medium, wherein the reserved extents are associated with a response time grade that is higher than other ones of the response time grades.

16. A processor-implemented method to execute on one or more processors that perform the method, comprising:
classifying storage locations in a storage medium according to at least three response time grades;
classifying data to be stored in the storage locations according to at east three access frequency grades;
migrating the data between the storage locations according to a predicted access frequency assigned to preemptive allocations of some of the storage locations, the predicted access frequency based on decay modeling of the response time grade and the access frequency grade associated with the data prior to migration; and
preemptively reserving a number of extents in the storage medium based on a calculated benefit lifetime of the data.

17. The method of claim 16, wherein the decay modeling comprises:
modeling the response time grades and/or the access frequency grades using an exponential decay formula.

* * * * *